United States Patent [19]

Mocker et al.

[11] Patent Number: 5,325,175
[45] Date of Patent: Jun. 28, 1994

[54] SOLID-BLOCK HOMODYNE INTERFEROMETER

[75] Inventors: Hans W. Mocker, Minneapolis; Thomas J. Wagener, Eden Prairie, both of Minn.

[73] Assignee: Honeywell Inc., Minneapolis, Minn.

[21] Appl. No.: 880,632

[22] Filed: May 8, 1992

[51] Int. Cl.$^5$ ............................. G01B 9/02; G01P 3/36
[52] U.S. Cl. ................................. 356/351; 356/285; 356/358; 359/490; 359/496; 359/638
[58] Field of Search ................. 356/28.5, 351, 358; 359/490, 496, 638

[56] References Cited

U.S. PATENT DOCUMENTS

| | | | |
|---|---|---|---|
| 4,084,180 | 4/1978 | Stoffels et al. | 359/638 X |
| 4,088,410 | 5/1978 | Smith | 359/638 X |
| 4,502,738 | 3/1985 | Lau et al. | 359/496 X |
| 4,666,296 | 5/1987 | Bailly-Salins | 356/358 X |
| 4,783,170 | 11/1988 | Bergstrom | 359/638 X |
| 4,836,678 | 6/1989 | Okaji | 356/358 X |
| 4,881,816 | 11/1989 | Zanoni | 356/358 X |
| 4,950,078 | 8/1990 | Sommargren | 356/358 X |
| 4,973,153 | 11/1990 | Yokokura et al. | 356/358 X |
| 5,099,486 | 3/1992 | Arcarekar et al. | 372/32 |
| 5,172,186 | 12/1992 | Hosoe | 356/358 |

FOREIGN PATENT DOCUMENTS

| | | |
|---|---|---|
| 0349343 | 3/1990 | European Pat. Off. |
| 2556841 | 6/1985 | France. |
| 2582807 | 5/1986 | France. |

OTHER PUBLICATIONS

"Confocal LDV Utilizing a decoupling beamspliter combiner," by D. Kreid et al., in *Applied Optics*, vol. 15, No. 1, Jan. 1976.

"Accurate and Compact Solid-State Doppler Velocimeters," by H. Mocker et al., in *IRIS Speciality Group on Active Systems*, Silver Springs, Md., Oct. 16-18, 1990.

"High Accuracy Laser Doppler Velocimeter Using Stable, Long Wavelength Semiconductor Lasers", by H. Mocker et al., in *Applied Optics*, vol. 28, No. 22, Nov. 15, 1989.

G. Makosch et al., "Measuring the flight height of magnetic heads on magnetic disks", *IBM Technical Disclosure Bulletin*, vol. 15, No. 4, Sep. 15, 1972 pp. 1322-1323.

P. L. Wizinowich, "Phase shifting interferometry in the presence of vibration: a new algorithm and system", *Applied Optics*, vol. 29, No. 22, Aug. 1, 1990, pp. 3271-3279.

H. P. Meiser et al., "Laserinterferometer in der industriellen Messtechnik", *Feinwerktechnik+Messtechnik*, vol. 96, No 10, 1988, pp. 421-424.

*Primary Examiner*—Robert J. Warden
*Assistant Examiner*—Robert Carpenter
*Attorney, Agent, or Firm*—John G. Shudy, Jr.

[57] ABSTRACT

A solid-block homodyne Doppler interferometer utilizing continuous-wave or pulse-wave light beam technology. A pulse-wave light beam version of the homodyne interferometer compares the pulse-wave return signal with a continuous-wave local oscillator signal, thereby permitting the interferometer to be utilized over a wide range of distances.

10 Claims, 4 Drawing Sheets

SOLID-BLOCK HOMODYNE INTERFEROMETER

BACKGROUND OF THE INVENTION

The present invention pertains to Doppler detector systems, particularly to laser Doppler homodyne interferometers. More particularly, the present invention pertains to a solid-block homodyne interferometer.

Numerous homodyne interferometers in laser Doppler systems utilizing polarization beamsplitters and Brewster plates, have been known for some time. Such an interferometer typically uses several mirrors and beamsplitters with one or more fractional waveplates. The disadvantages of such conventional systems include tedious alignment required for the mirrors and beamsplitters, sensitivity to vibration which reduces accuracy of detection, the cumbersome size due to the numerous mirrors and beamsplitters, and moderate efficiency.

The U.S. government may have certain rights in the subject invention.

SUMMARY OF THE INVENTION

The present invention eliminates the need for individually supported mirrors and beamsplitters. In lieu of such mirrors and beamsplitters, a glass prism block is used having two 90 degree prisms and an etalon. This interferometer derives a local oscillator signal of an appropriate strength and provides a transmit-receive switch of high efficiency which is achieved via polarization coatings on the etalon. Due to the precise tolerances on the angles of the prisms and etalon, the back scattered beam (signal beam) is spatially congruent with the local oscillator signal or beam, thus assuring a high mixing efficiency. Both prisms and the etalon are epoxied together to eliminate any air interface among them.

The advantages of the present invention are that alignment requirements are eliminated, there is suitability in high gravity-environments, there is high efficiency (i.e., 97–98%), and adaptability for both continuous-wave and pulse-wave Doppler systems. The invention is applicable to optical air data systems, wind shear detection using Rayleigh scattering, and wing vortex detection at airports.

DESCRIPTION OF THE PREFERRED EMBODIMENT

Figure 1:
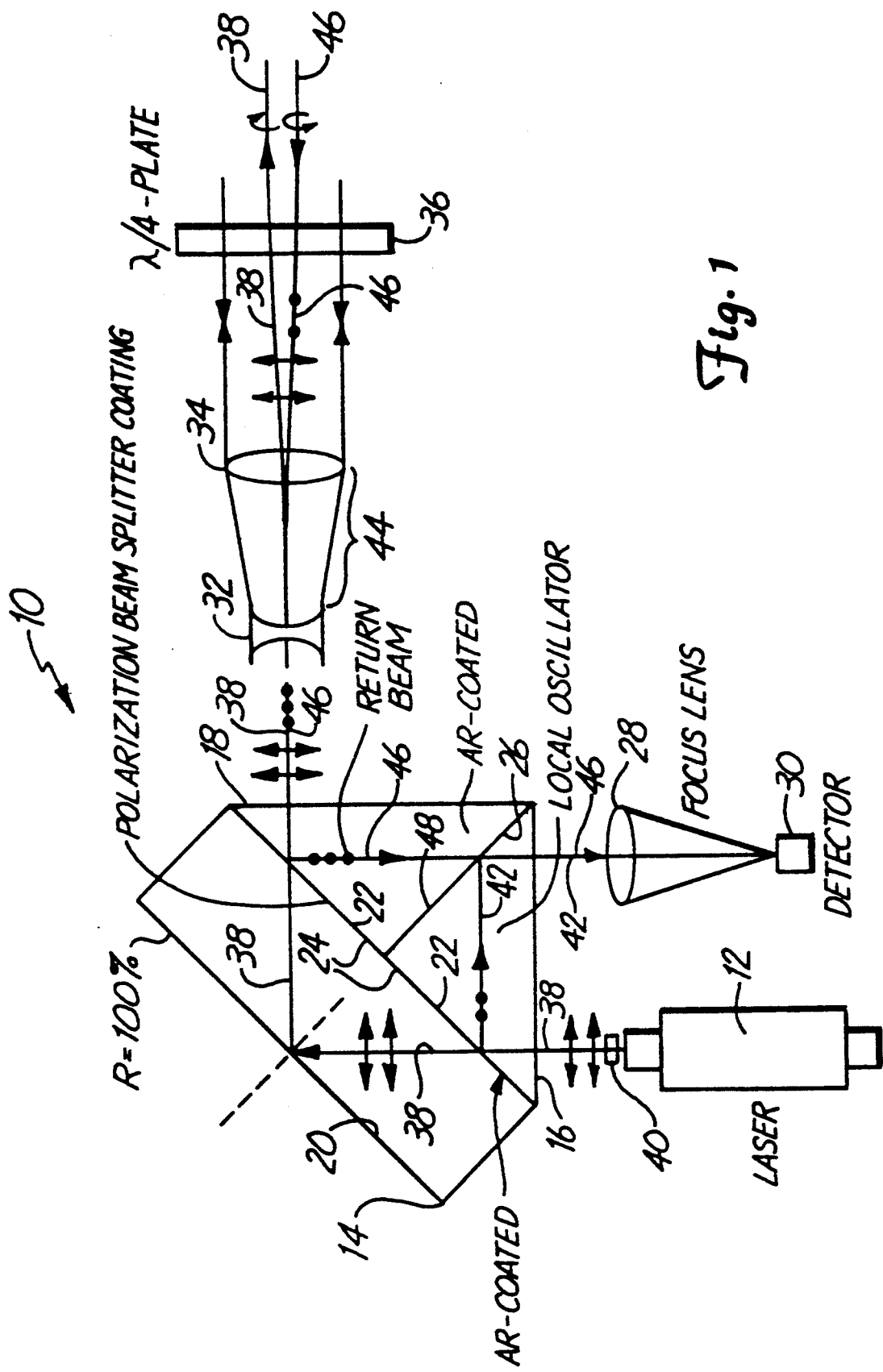
FIG. 1 is a diagram of the basic solid-block interferometer utilizing continuous-wave beam technology.

FIG. 1 shows a layout of solid-block interferometer 10 utilizing a continuous-wave light source 12. Laser 12 may be a Nd:YAG laser or an $Er^{3+}$:glass laser which emits beam 38 having a P polarization that enters prism 16 and impinges polarization beamsplitter coating 22 which is coated on the surface of block 14. Coating 22 reflects any laser light which has an S orientated linear polarization. Laser 12 may be tilted so as to create a slight S oriented polarization in its beam so that a portion of beam 38 is reflected by coating 22 as beam 42 in an S-oriented polarization. Coating 22 passes light having a P polarization and reflects light having an S polarization. The linear polarization of beam 38 may also be shifted or tilted by the use of a Faraday rotator 40 so as to obtain beam 42. The power of beam 42 is only about 0.2% of the power of beam 38. Beam 42 constitutes the local oscillator for system 10. The remainder of beam 38 having the P oriented polarization goes through coating 22 and impinges surface 20 which is a mirror having a reflectivity of nearly 100%. Beam 38 is reflected off surface 20 and goes on through coating 24. Coating 24 is an anti-reflective coating on certain surfaces of prisms 16 and 18. Beam 38, still having a P-oriented polarization, passes through coating 22 and exits prism 18 to enter a beam expander 44 having concave lens 32 and convex lens 34. Beam 38 then passes through quarter-wave plate 36. Plate 36 converts the P-oriented polarization of beam 38 into beam 38 having a first circular polarization. Beam 38 then impinges a target and is reflected back by the target as beam 46 having a second circular polarization. Beam 46 passes through quarter-wave plate 36 which transforms the second circular polarization into an S-oriented linear polarization for beam 46. Beam 46 then passes through expander 44 and enters prism 18 and impinges polarization coating 22 which reflects S-oriented linearly polarized light of which beam 46 is. Beam 46, as a return beam, is reflected by surface 22 on through prism 18 and prism 16. The common adjoining surfaces 48 of prisms 16 and 18 have an anti-reflective coating. Beam 46 passes through surface 48 with very little loss. Likewise, beam 42 is reflected by surface 48 with very large loss. However, a sufficient amount of beam 42 (i.e., approximately 1%) is reflected to join in a common beam with beam 46. The reason for the disparate treatment of beams 42 and 46, respectively, is that beam 42 has a strong power origin and return signal 46 is a signal that is weak relative to beam 38. The common beam of beams 42 and 46 passes through focus lens 28 and on to detector 30.

Reflected beam 46 is affected in frequency by movement of the target which reflects Doppler-shifted beam 46. The combining of beam 46 with beam 42 results in an interference as indicated by detector 30 so as to provide information about the target, such as velocity.

Figure 2:
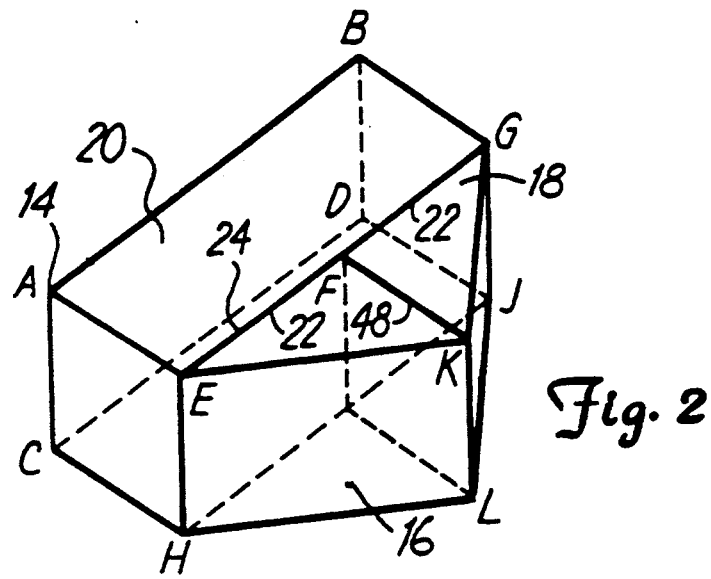
FIG. 2 is a diagram of the solid-block utilized in the interferometer.

FIG. 2 shows block 14 and prisms 16 and 18 with more detail. Surface ABCD has optical coating 20 which has a high reflectivity for P-oriented linearly polarized light under a 45 degree angle of incidence. Surface EGHJ has a polarization beamsplitter coating 22 which for an angle of incidence of 45 degrees has a high transmission for linearly polarized light of a P orientation and a high reflection for linearly polarized light of an S orientation. These transmission and reflection ratios are in excess of 99%. Surface EFHI of prism 16 has an anti-reflective coating 24 with a reflectivity of less than 0.2%. Surface EKHL of prism 16 has an anti-reflective coating having a reflectivity of less than 0.2%. Surface FKIL of prism 16 has a reflective coating having a reflectivity of about 1%. Surface FGIJ of prism 18 has an anti-reflective coating 24 which has a reflectivity of less than 0.2%. Surface KGLJ of prism 18 has an anti-reflective coating which has a reflectivity of less than 0.2%. Surface FKIL has a reflective coating which has a reflectivity of about 1%.

For the continuous-wave embodiment 10, the dimensions of block 14 for lengths AB, CD, EG, HJ are five centimeters. The dimensions of block 20 for lengths BG, DJ, BD, GJ, AE, CH, AC, and EH are 1.5 centimeters. The dimensions of prisms 16 and 18 for lengths FI, KL, EH, GJ are 1.5 centimeters. Dimensions of prisms 16 and 18 for lengths EF, FG, HI, and IJ are 2.5 centimeters.

Figure 4:
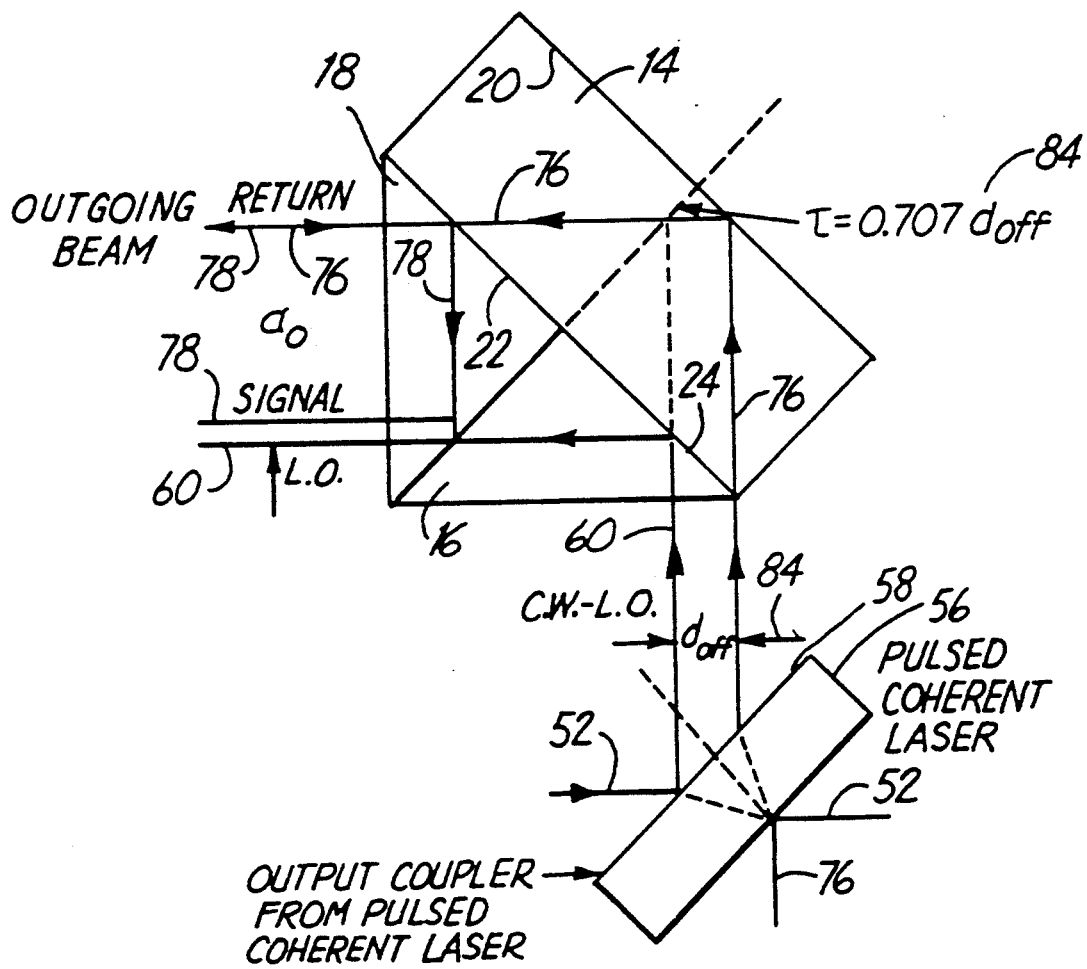
FIG. 4 is the solid-block layout for the pulse-wave version of the interferometer.
Figure 3:
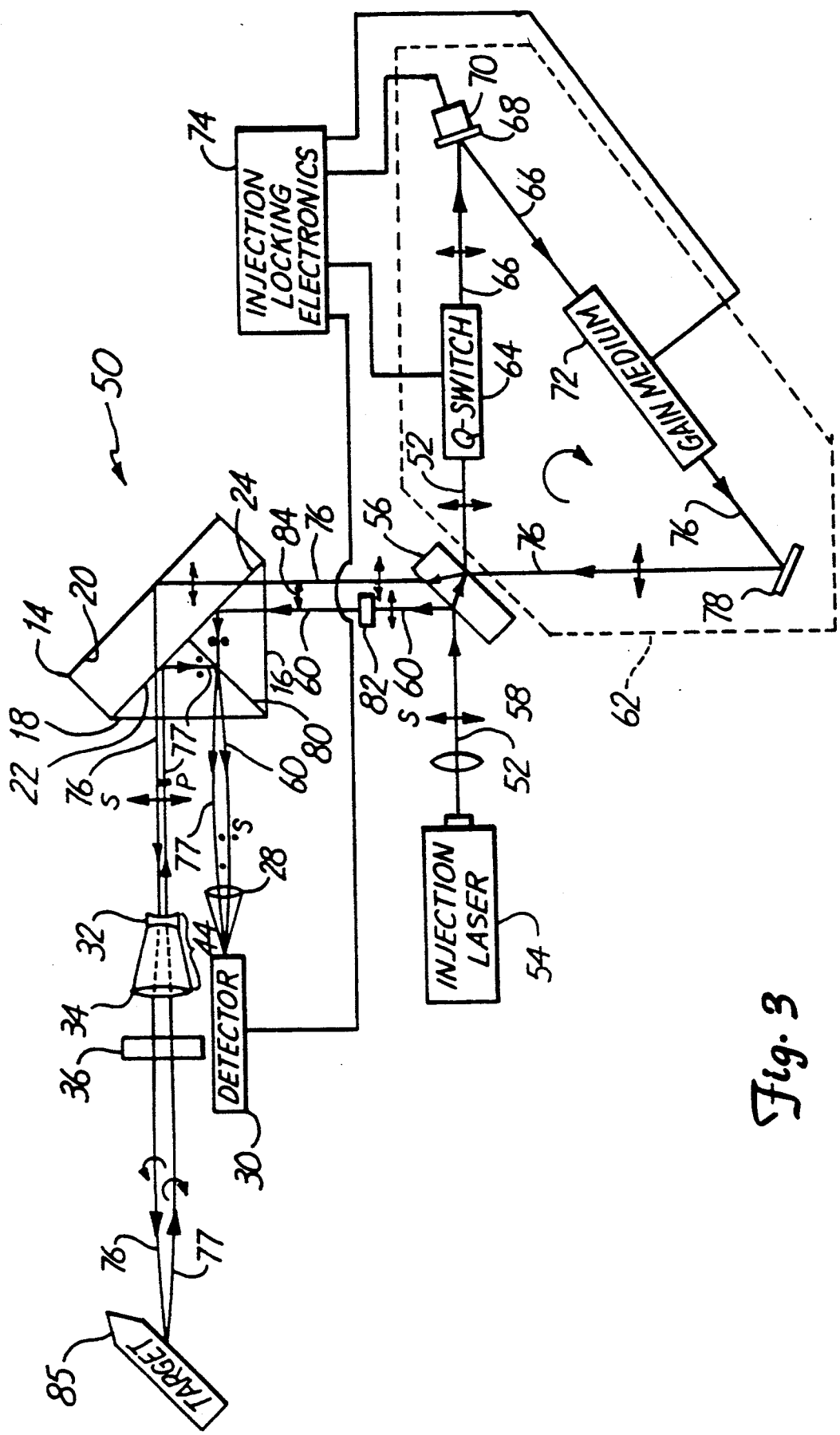
FIG. 3 is a diagram of the solid-block interferometer utilizing pulse-wave light beam technology.

FIG. 3 shows a pulse-wave embodiment 50 of the present invention. Such a system 50 may be used where high-powered pulses 76 are propagated toward a target 85 and scattered pulse return 77 is mixed against a continuous-wave local oscillator 60. System 50 prevents high-powered pulses 76 that are being propagated toward target 85, from falling on detector 30 and thereby avoiding saturation of detector 30. Beam 60 and beam 76 of embodiment 50 of FIG. 3 described below and in FIG. 4, are parallel to each other as they enter prism 16. A distance 84 between beam 60 and beam 76 affects certain dimensions of block 14 and prisms 16 and 18 as described in FIG. 2. Lengths AE, CH, BG and DG are increased by distance 84 multiplied by $\sqrt{2}/2$. Lengths AB, EG, CD and HG are increased by distance 84 multiplied by $\sqrt{2}$. Lengths EF, HI, GF and JI are each increased by distance 84 multiplied by $\sqrt{2}/2$, Lengths FK and IL are increased appropriately to maintain prisms 16 and 18 and block 14 within the specifications as noted below.

Figure 5:
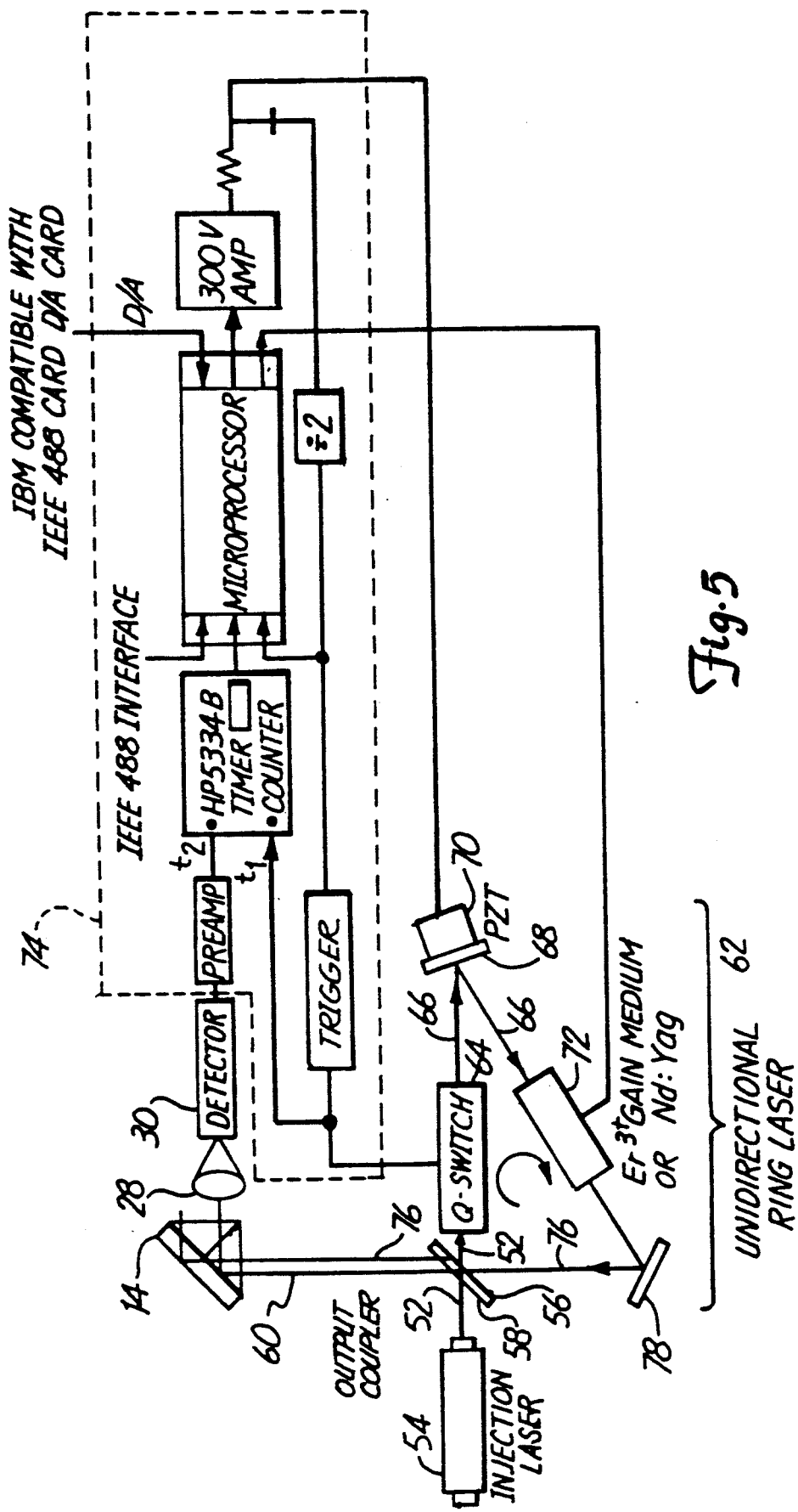
FIG. 5 is a diagram of the electronics for injection locking of the unidirectional ring laser.

The parallelity of surface ABCD to surface EGHJ of block 14 is equal to or less than 1 arc second. The relationship of surface EFHI to surface FKIL of prism 16 is 90 degrees +/−1 arc second, The relationship of EFHI to surface EKHL of prism 16 is 45 degrees +/−1 arc second, The relationship of surface FKIL to surface EKHL of prism 16 is 45 degrees +/−1 arc second, The relationship of GFJI to surface FKIL of prism 18 is 90 degrees +/−1 arc second, The relationship of surface FKIL to surface KGLJ of prism 18 is 45 degrees +/−1 arc second, The relationship of FGIJ to surface KGLJ of prism 18 is 45 degrees +/−1 arc second. The surface flatness of all above mentioned surfaces is approximately 0.2G or 1/5 of the wavelength of the light transmitted or reflected. The scratch/dig ratio is 40/20, Injection laser 54 emits a beam 52 having a linear polarization of P orientation, Beam 52 impinges glass slab 56 having a thickness from ⅜ to ½ inch. An antireflective coating 58 is on slab 56. Coating 58 reflects about 0.2% of beam 52 as local oscillator beam 60 having a polarization of P orientation. Beams 52 and 60 are continuous-wave laser beams. Remaining beam 52 goes on through glass slab 56 and enters device 62 which is regarded as a unidirectional ring laser 62. Beam 52 enters Q-switch 64. Pulse-wave beam 66, having a linear polarization of P orientation, exits Q-switch 64 and impinges and is reflected by mirror 68 which is situated on a piezoelectric support 70 which functions to move mirror 68 so as to tune ring laser 62. Beam 66 is reflected out to gain medium 72. Gain medium 72 is pumped and then exits a high power laser pulse beam 76 having a linear polarization of P orientation. Gain medium 72, piezoelectric movable mirror support 70, Q-switch 64 and detector 30 are connected to electronics 74 for appropriate implementation of unidirectional ring laser 62. Electronics 74 is illustrated in FIG. 5.

Beam 76 from gain medium 72 impinges mirror 78 and is reflected to glass slab 56 at the area where original beam 52 entered ring laser 62. Beam 76 passes through slab 56 and exits as a pulse beam which is parallel to and at a distance 84 from local oscillator beam 60.

Beam 76 impinges and enters prism 16, and exits prism 16 into block 14. Beam 76 is reflected by reflective surface 20 of block 14, out of block 14 into and through prism 18. From prism 18, beam 76 goes through beam expander 44 to quarter wave length plate 36. Plate 36 converts the P-oriented linear polarization of beam 76 into beam 76 having a first circular polarization. Beam 76 impinges a target 85 and is returned as beam 77 having a second circular polarization. Returning beam 77 goes through quarter-wave length plate 36 and becomes beam 77 having an S-oriented linear polarization. Beam 77 goes through beam expander 44, enters prism 18 and impinges coating 22. Coating 22 is a polarization beam splitter coating which reflects light having an S-oriented linear polarization. Thus, beam 77 is reflected and impinges boundary 80 of prisms 16 and 18. Boundary 80 has a polarization beam splitter film which reflects linearly polarized light having an S orientation. Beam 77 is reflected by boundary 80 on through lens 28 and into detector 30. Beam 60, as reflected by surface 58 of slab 56, goes through Faraday rotator 82. Faraday rotator 82 rotates beam 60, which has a P orientation of linear polarization, just so slightly as to provide a beam 60 having a bit of S-orientation of linear polarization. Beam 60 enters prism 16 and impinges coating 22 which reflects the S-oriented portion of polarized beam 60 back out of prism 16, partially through boundary 80 which further diminishes the amplitude of beam 60. Beam 60 exits prism 18, goes through lens 28 and enters detector 30. Detector 30 compares beams 60 and 77, and determines the frequency difference between beams 60 and 77, and indicates the velocity of the target impinged by beam 76 and reflecting beam 77.

Embodiments 10 and 50 are merely among others that may implement the solid-block homodyne Doppler interferometer.

We claim:

1. A block homodyne interferometer comprising:

light source means for emitting a first light beam having a first polarization and a second polarization;

block means for reflecting the first light beam as a second light beam having the first polarization and as a third light beam having the second polarization;

wherein said block means comprises:

a transparent block having a first surface coated with a light-reflecting material, and a second surface parallel to the first surface, the second surface coated with a polarization beam splitting coating;

a first triangular prism having a first surface adhered to the second surface of said transparent block; and a second triangular prism having a first surface adhered to the second surface of said transparent block and having a second surface adhered to a second surface of said first triangular prism;

transmitting and receiving means for receiving the second light beam and transmitting out a fourth light beam having a third polarization towards a target along a path between said transmitting and receiving means and the target, for receiving at least a reflected portion of the fourth beam having a fourth polarization from the target along the path, and for conveying the received portion of the fourth beam as a fifth light beam having the second polarization to said block means to be reflected by said block means; and detector means for receiving the third and fifth light beams reflected from said block means, and for comparing the third and fifth beams to determine a velocity of the target.

2. The interferometer of claim 1 wherein the first light beam is a continuous-wave laser beam.

3. The interferometer of claim 2 wherein the first and second polarizations are orthogonal linear polarizations, and wherein the third and fourth polarizations are circular polarizations of opposite directions.

4. The interferometer of claim 3 wherein said transmitting and receiving means comprises a beam expander and a quarter-wave plate.

5. A block homodyne interferometer comprising:
a first prism having a first surface coated with a light-reflecting material and a second surface parallel to the first surface, the second surface coated with a polarization splitting material, and having a third surface;
a second prism having a first surface parallel and adhered to the second surface of said first prism, having a second surface adjacent and approximately perpendicular to the second surface of said first prism, and having a third surface;
a third prism having a first surface parallel and adhered to the second surface of said first prism, having a second surface parallel and adhered to the second surface of said second prism, and having a third surface;
light source emitting means for emitting a first light beam having first and second polarizations;
detector means for detecting light; and
wherein:
the first light beam passes through the third and first surfaces, respectively, of said second prism, and impinges the second surface of said first prism;
the second surface of said first prism passes a portion of the first light beam as a second light beam having the first polarization, and reflects a portion of the first light beam as a third light beam having the second polarization;
the second surface of said second prism reflects at least a portion of the third light beam as a fourth light beam having the second polarization and having a path that passes through the third surface of said second prism, and the fourth light beam impinges said detector means;
the second light beam impinges and is reflected by the first surface of said first prism, as a fifth light beam having the first polarization;
the fifth light beam passes through the second surface of said first prism, the first surface of said third prism, and the third surface of said third prism;
the fifth light beam having the first polarization, impinges a target and is reflected by the target as a sixth light beam having the second polarization;
the sixth light beam passes through the third and first surfaces, respectively, of said third prism and is reflected by the second surface of said first prism as a seventh light beam having the second polarization;

the seventh light beam passes through the first surface and the second surface, respectively, of said third prism; and
the seventh light beam passes through the second surface of said second prism, has a path that coincides with the path of the fourth light beam, passes through the third surface of said second prism, and impinges said detector means.

6. A block homodyne interferometer comprising:
first light source means for emitting a first light beam having a first polarization;
splitting means for splitting the first light beam into a second light beam having the first polarization and a third light beam having the first polarization;
second light source means for receiving and being excited by the second light beam and emitting a fourth light beam having a first polarization;
polarization means for converting the third light beam into a fifth light beam having a second polarization;
block means for reflecting the fourth beam as a sixth light beam having the first polarization, and reflecting the fifth beam as a seventh light beam having the second polarization;
a transmitting and receiving means for receiving the sixth light beam and transmitting the sixth light beam as an eighth light beam having a third polarization towards a target for receiving a reflected ninth light beam from the target having a fourth polarization and returning the ninth light beam as a tenth light beam having the second polarization that is reflected by said block means as an eleventh light beam having the second polarization; and
detector means for receiving the seventh and eleventh light means and detecting an interferometric relationship between the seventh and eleventh light beams.

7. The interferometer of claim 6 wherein said block means comprises:
a first prism having a first surface coated with a light-reflecting material and a second surface parallel to the first surface, the second surface coated with a polarization splitting material;
a second prism having a first surface parallel and adhered to the second surface of said first prism, and having a second surface adjacent and perpendicular to the second surface of said first prism; and
a third prism having a first surface parallel and adhered to the second surface of said first prism, and having a second surface parallel and adhered to the second surface of said second prism.

8. The interferometer of claim 7 wherein:
the first light beam is a continuous-wave laser; and
the fourth light beam is a pulsed-wave laser.

9. The interferometer of claim 8 wherein:
said first light source is an injection laser source; and
said second light source is a unidirectional ring laser source.

10. The interferometer of claim 9 wherein said unidirectional ring laser comprises:
a Q-switch for receiving the second light beam and passing on a twelfth light beam having the first polarization;
first mirror for reflecting the twelfth light beam;
a gain medium for receiving the twelfth light and emitting the fourth light beam; and
a second mirror for reflecting the fourth light beam out of said second light source.

* * * * *